United States Patent [19]

Perona

[11] Patent Number: 5,657,181
[45] Date of Patent: Aug. 12, 1997

[54] OPENING LEVER FOR MAGNETIC TAPE CARTRIDGE DOOR

[75] Inventor: Mark W. Perona, San Diego, Calif.

[73] Assignee: Iomega Corporation, Roy, Utah

[21] Appl. No.: 543,134

[22] Filed: Oct. 13, 1995

Related U.S. Application Data

[63] Continuation-in-part of Ser. No. 531,617, Sep. 21, 1995.
[51] Int. Cl.⁶ .......................... G11B 5/008; G11B 15/00; G11B 17/00
[52] U.S. Cl. .................................. 360/96.5; 360/93
[58] Field of Search .................................. 360/96.5, 132, 360/131, 93; 242/397

[56] References Cited

U.S. PATENT DOCUMENTS

| | | | |
|---|---|---|---|
| 4,636,890 | 1/1987 | Rudi et al. | 360/96.5 |
| 5,025,334 | 6/1991 | Perona et al. | 360/96.5 |
| 5,210,664 | 5/1993 | Perona | 360/93 |

FOREIGN PATENT DOCUMENTS

1-146155A  6/1989  Japan.

*Primary Examiner*—Robert S. Tupper
*Assistant Examiner*—Adriana Giordana
*Attorney, Agent, or Firm*—Woodcock Washburn Kurtz Mackiewicz & Norris LLP

[57] ABSTRACT

A magnetic tape drive for reading/writing data on magnetic tape in a cartridge of the type in which a driven roller in the cartridge moves tape past a read/write head in the drive, has a door opening lever disposed parallel to the direction of insertion of the cartridge. The lever is mounted on a pivot at one end on an axis perpendicular to the direction of insertion of the cartridge. The other end of the lever bears against the actuating portion of the door to open the door as the cartridge enters the drive. The lever is moveable about its pivot only to the side of the cartridge to accommodate an insertion of the cartridge into the drive.

2 Claims, 11 Drawing Sheets

OPENING LEVER FOR MAGNETIC TAPE CARTRIDGE DOOR

RELATED APPLICATIONS

This application is a continuation-in-part of copending U.S. application Ser. No. 08/531,617 filed Sep. 21, 1995 (Attorney's Docket No. IOTA-0052) entitled "Opening Lever for Magnetic Tape Cartridge Door" by Mark W. Perona.

This application is related to applications HEAT DIFFUSER FOR MAGNETIC TAPE DRIVE, Perona, Ser. No. 08/543,127, filed Oct. 13, 1995 (Attorney Docket No. IOTA-0059), abandoned SNAP-IN CHASSIS TAPE DRIVE, Perona, Ser. No. 08/543,133, filed Oct. 13, 1995, now U.S. Pat. No. 5,612,837 (Attorney Docket No. IOTA-0060) and CLIP FOR ATTACHING TAPE DRIVE MOTOR TO CHASSIS, Perona, Ser. No. 08/543,128, filed Oct. 13, 1995, (Attorney Docket No IOTA-0062) which are incorporated herein by reference.

BACKGROUND OF THE INVENTION

This invention relates to a magnetic tape drive and more particularly to a lever for opening the door in a cartridge as it is inserted into the drive.

U.S. Pat. No. 5,210,664-Perona shows a tape drive for use with so-called "Mini-Data" cartridges. There are standards for these drives so that drives manufactured by different companies can read and write data interchangeably. These standards are referred to as the "QIC" (Quarter-Inch Cartridges) standards. One set of standards is referred to as the "QIC-80 Standards for 250–800 megabyte products."

Recently, a new wide tape cartridge referred to as "TRAVAN" has been announced for use with such drives. The TRAVAN cartridge has a metal base plate which is a reference for all cartridge/drive interface specifications.

The TRAVAN cartridge has a door through which the read/write head in the drive accesses the tape. This door is opened as the cartridge is inserted into the drive. The cartridge door is pivoted on a hinge about an axis which is perpendicular to the direction of insertion of the cartridge into the drive. An actuating portion of the door is on the side of the hinge adjacent to the side of the cartridge. As the cartridge is inserted into the drive, pushing on this actuating portion opens the access portion of the door which is on the other side of the hinge.

Prior art drives for reading the TRAVAN cartridge have used a door opening slide pin which moves toward the back of the drive as the cartridge is inserted. Movement of the slide pin is necessary to accommodate the cartridge in the drive. However, movement of the slide pin in the direction of insertion of the cartridge is undesirable because the door opening motion is not positive. It does not have stiffness in the direction which will operate the actuating portion of the cartridge door.

The slide pin must be biased against movement in the direction of insertion of the cartridge so that the door is opened properly. On the other hand, the cartridge must be held in the drive with a bias which is at least sufficient to provide the proper force of engagement between the drive roller and the driven roller in the cartridge. The QIC standards specify a force of engagement between the drive roller and the driven roller. In other drives for reading the TRAVAN cartridges, the bias on the slide pin is opposite to the bias used to hold the cartridge in the drive to provide the proper force of engagement between the driven roller and the drive roller. Adjusting and maintaining this differential bias is difficult.

It is an object of the present invention to provide a door opening actuator which is more reliable than the prior art.

SUMMARY OF THE INVENTION

A magnetic tape drive for reading/writing data on magnetic tape in a cartridge of the type in which a driven roller in the cartridge moves tape past a read/write head in the drive has an opening lever for a door in the cartridge which is pivoted about a hinge in an axis perpendicular to the direction of insertion of the cartridge.

In accordance with the invention, the opening lever is disposed parallel to the direction of insertion of the cartridge so that it bears against an actuating portion of the door in the cartridge. The lever is stiff in the direction which operates the actuating portion of the door. This makes opening of the cartridge door more reliable.

The lever is mounted on a pivot at the rear of the lever. The lever is movable about the pivot only to the side of the cartridge to accommodate insertion of the cartridge into the drive. The lever is biased to return it to a normal condition when the cartridge is removed, but this bias does not act against the bias which holds the cartridge in the drive. Therefore, providing the specified engagement force between the drive roller and the driven roller is easier.

The foregoing and other objects, features and advantages of the invention will be better understood from the following more detailed description and appended claims.

BRIEF DESCRIPTION OF THE DRAWINGS

FIGS. 5 and 5A are top views of the chassis; FIG. 5A shows a cartridge being inserted;

DESCRIPTION OF THE PREFERRED EMBODIMENT

Figure 1:
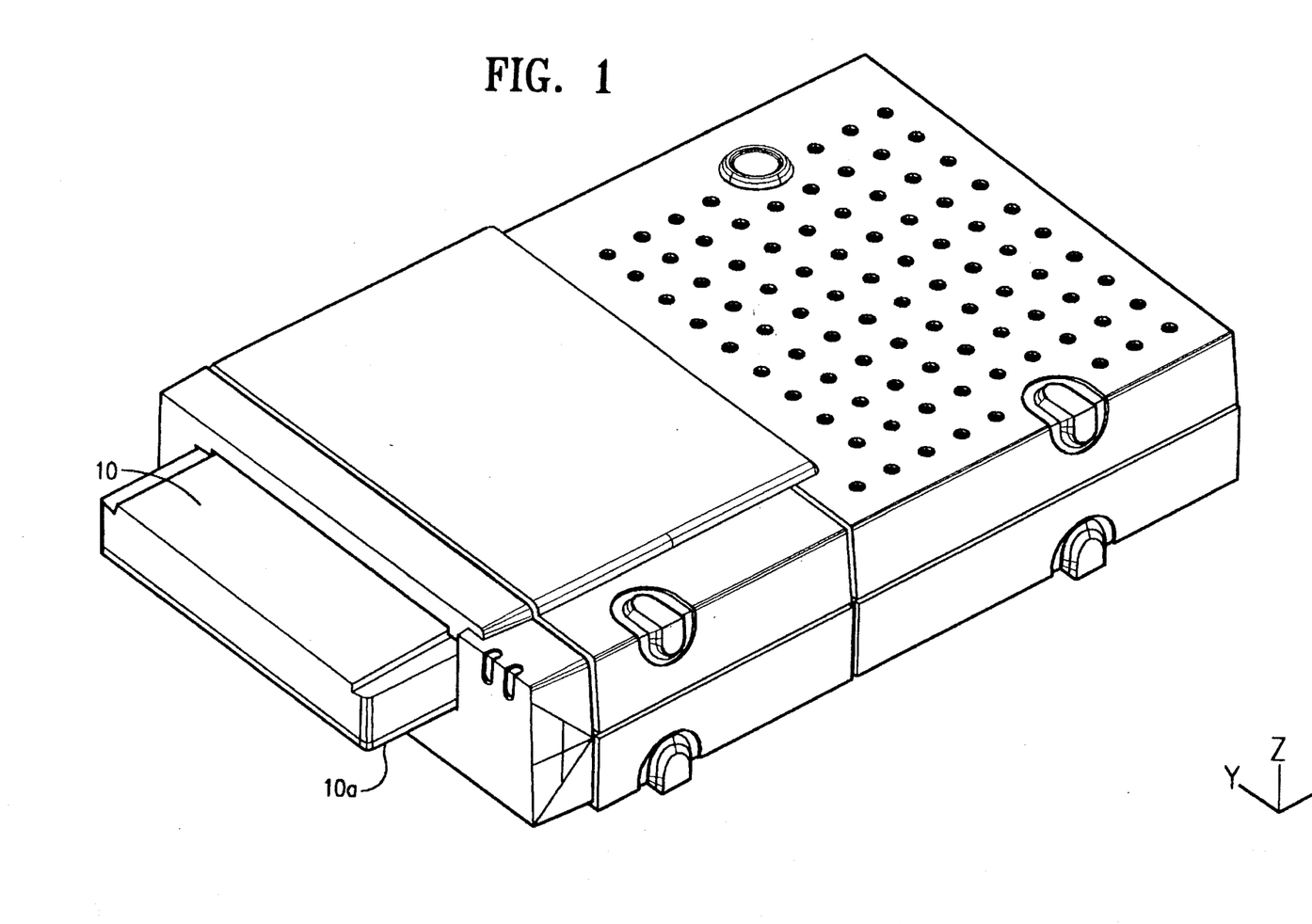
FIG. 1 is a perspective view of the tape drive of the present invention with a cartridge.
Figure 2:
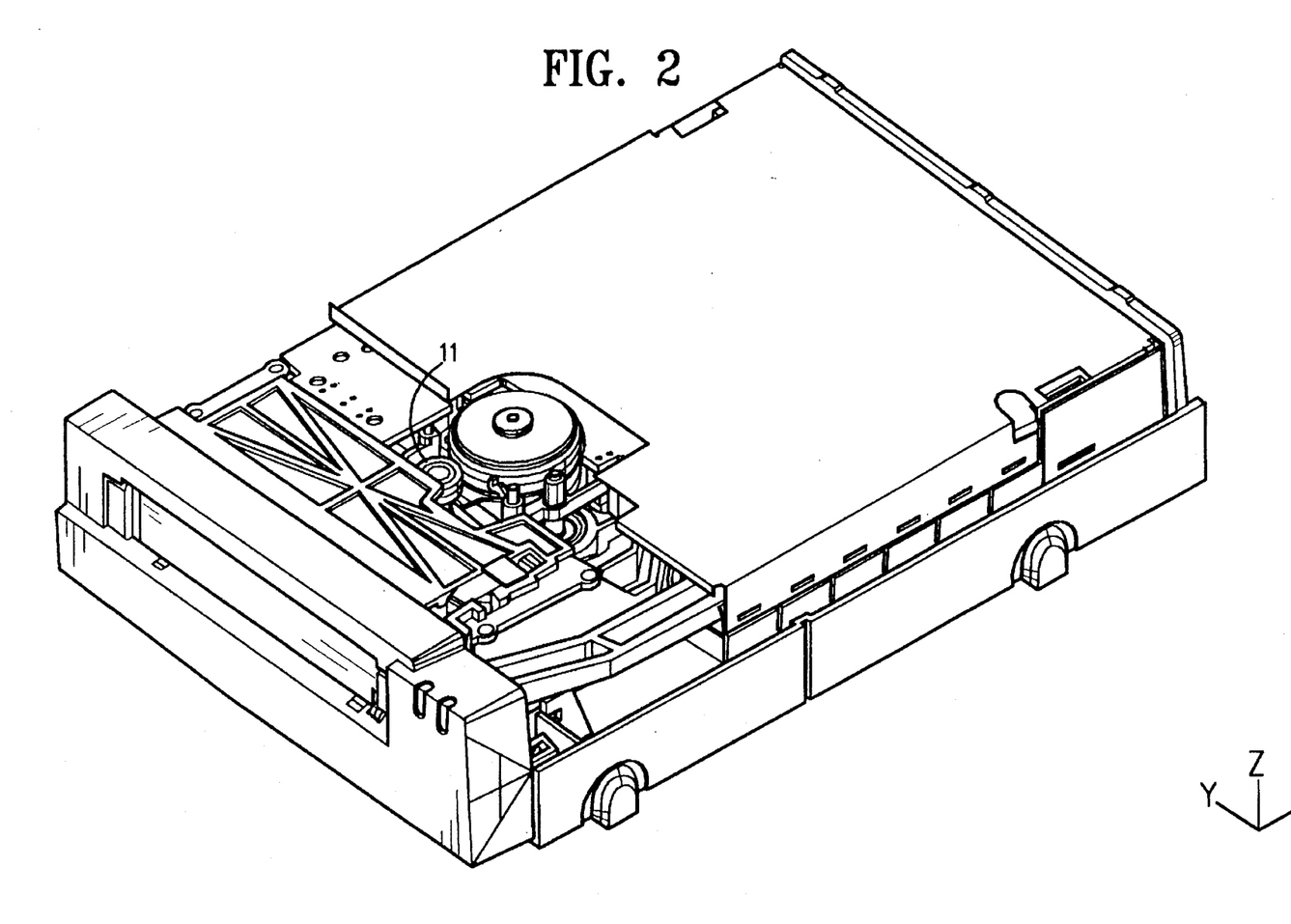
FIG. 2 is a perspective view partially broken away.
Figure 3:
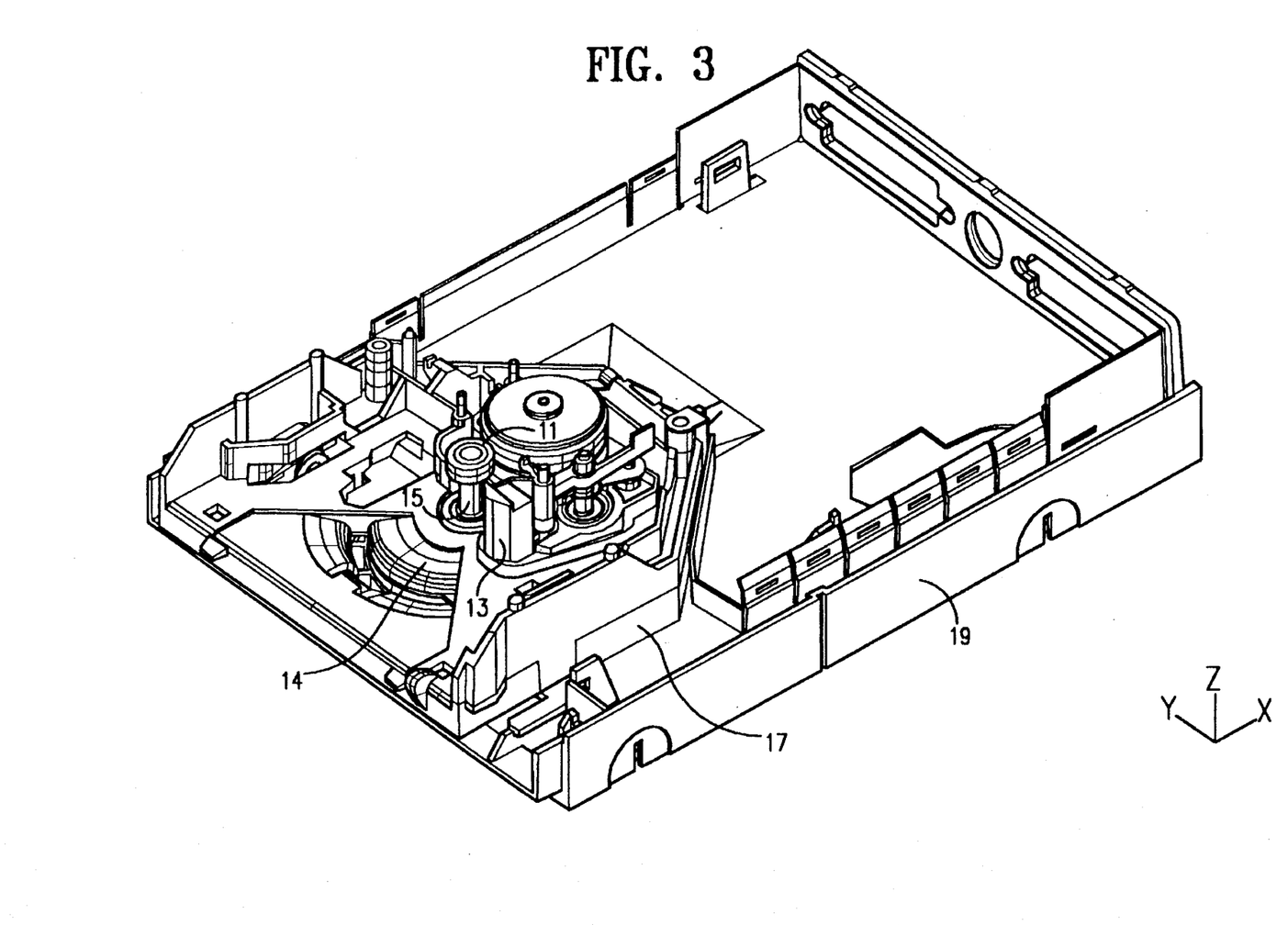
FIG. 3 is a perspective view further broken away.

Tape drives of the type shown in FIG. 1 are for use with cartridges 10 having a metal baseplate 10a. As shown in FIG. 2, the drive includes a drive roller 11 which engages a driven roller 12 (FIG. 6) in the cartridge to move magnetic tape in the cartridge. The tape is read by a magnetic head 13 (FIG. 9) in the drive.

The drive roller 11 is driven by a motor 14 which has a drive shaft 15. The motor 14 is mounted beneath the chassis 17. The chassis 17 is snapped into the pan 19.

Figure 4A:
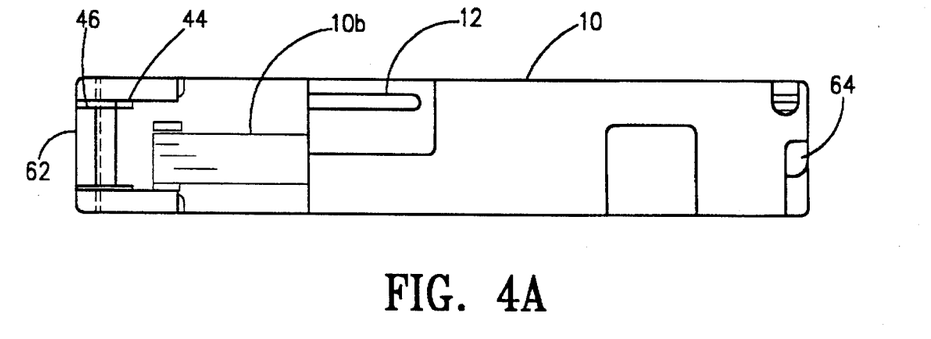
FIGS. 4A and 4B show the front of the cartridge with the door open and closed, respectively.
Figure 4B:
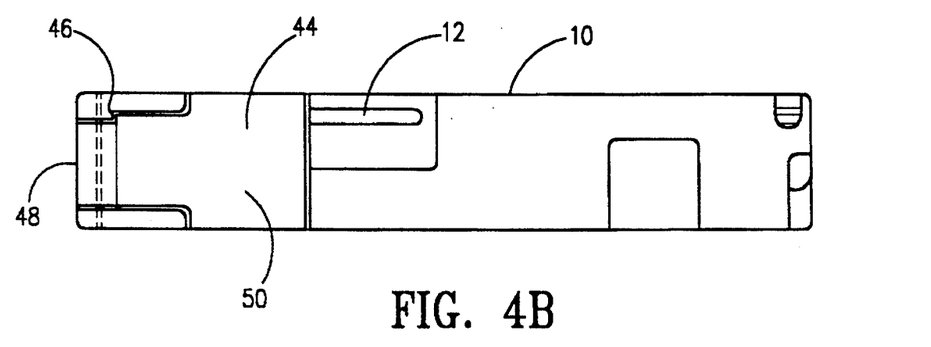

Referring to FIGS. 4A and 4B, the cartridge 10 has a door 44 through which the read/write head engages the tape 10b. The door is pivoted about a hinge 46 in an axis perpendicular to the direction of insertion of the cartridge. The door has an actuating portion 48 on one side of the hinge and an opening portion 50 on the other side of the hinge. When the actuating portion 48 is pushed into the cartridge, the opening portion 50 moves outwardly to provide access to the magnetic tape 10b which is engaged by the read/write head 13.

Figure 5:
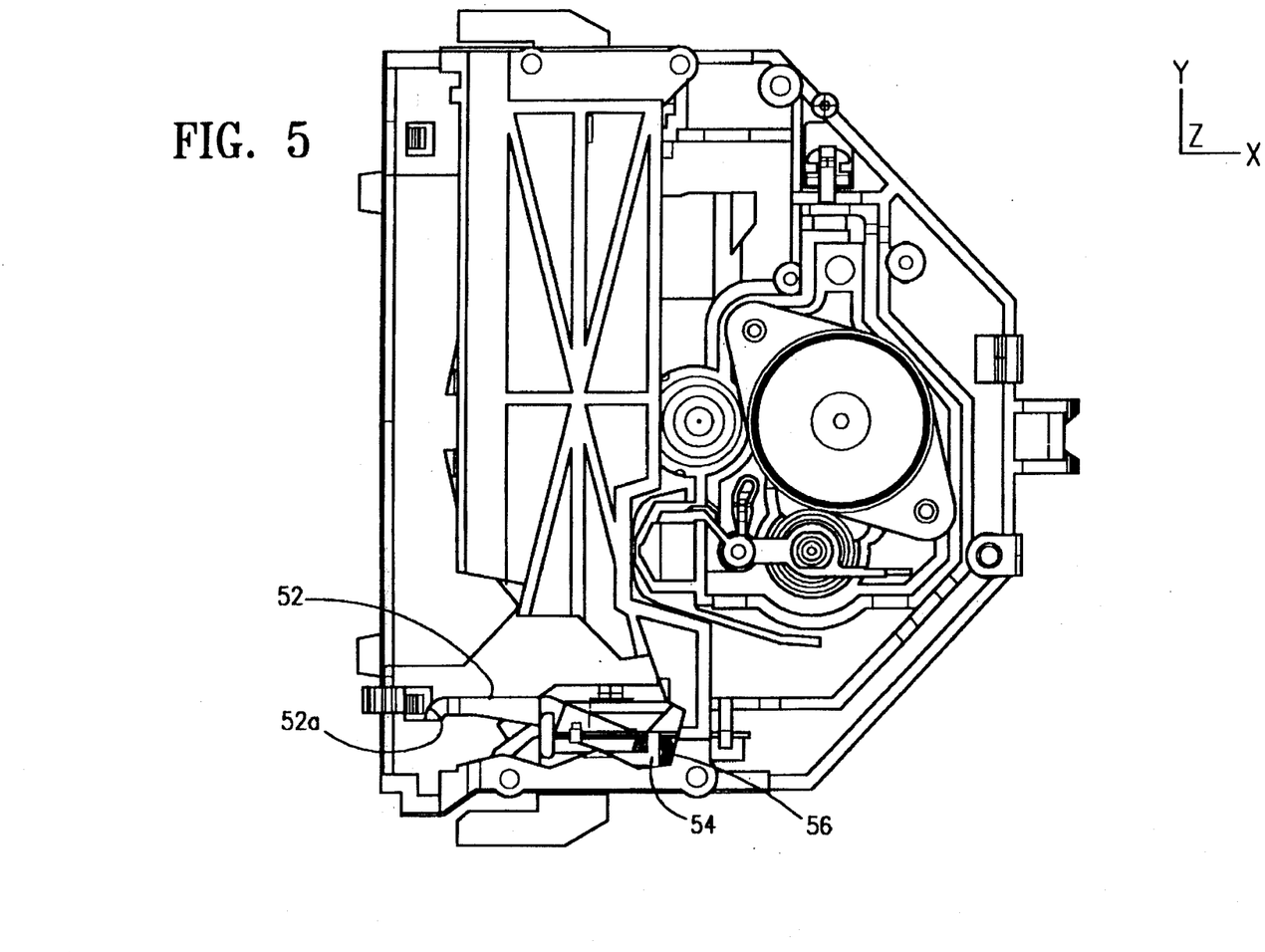
Figure 5A:
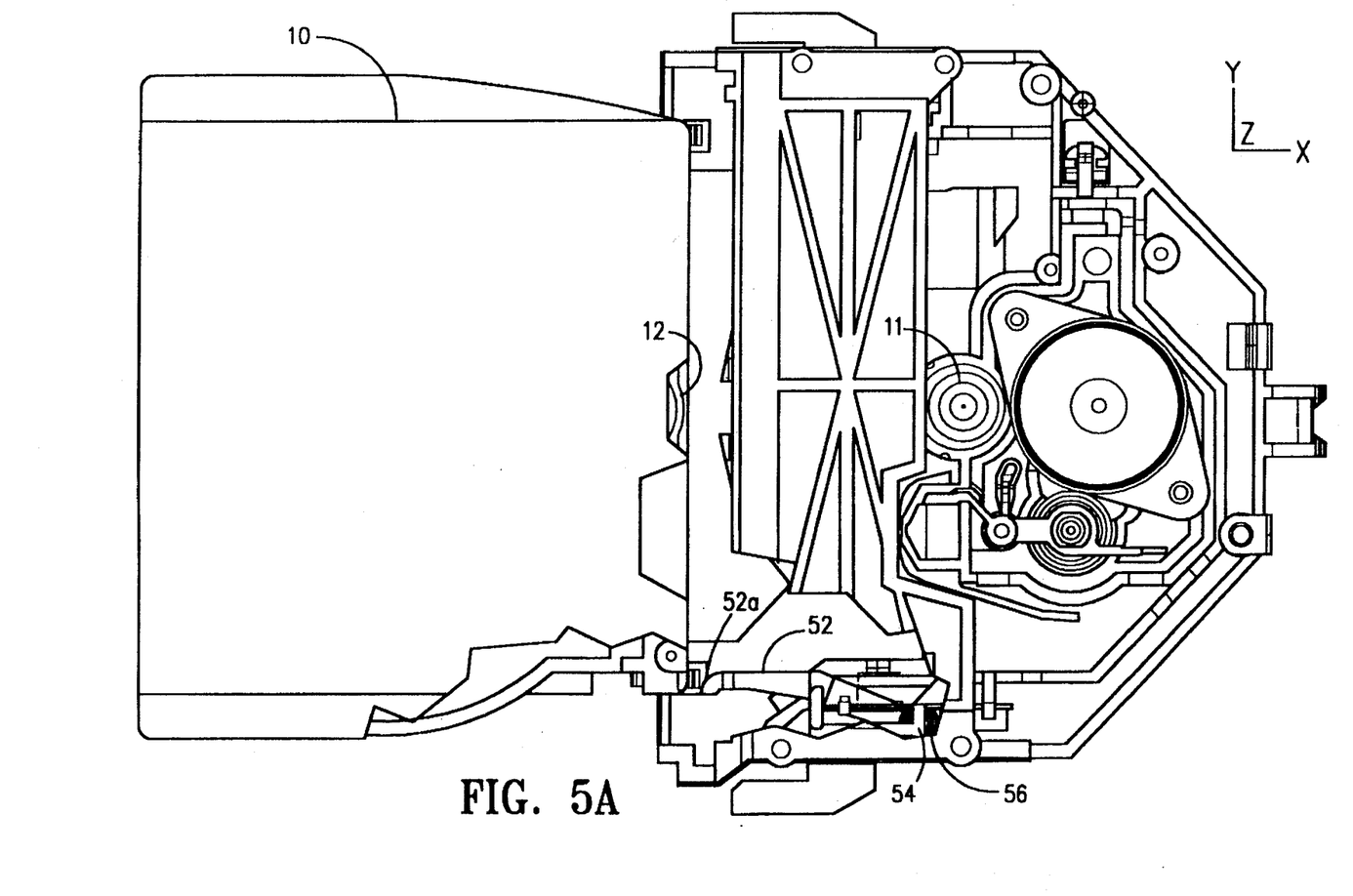
Figure 6:
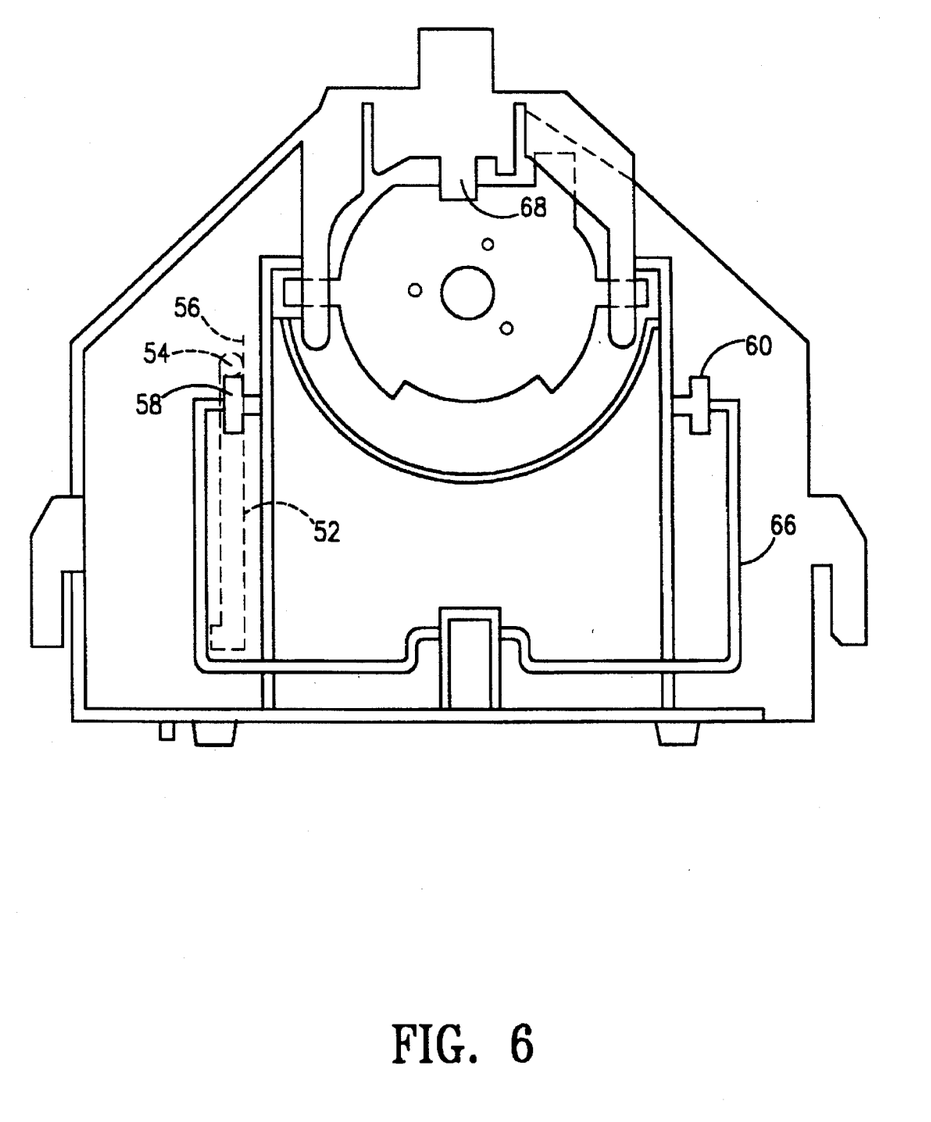
FIG. 6 is a bottom view of the chassis.
Figure 7:
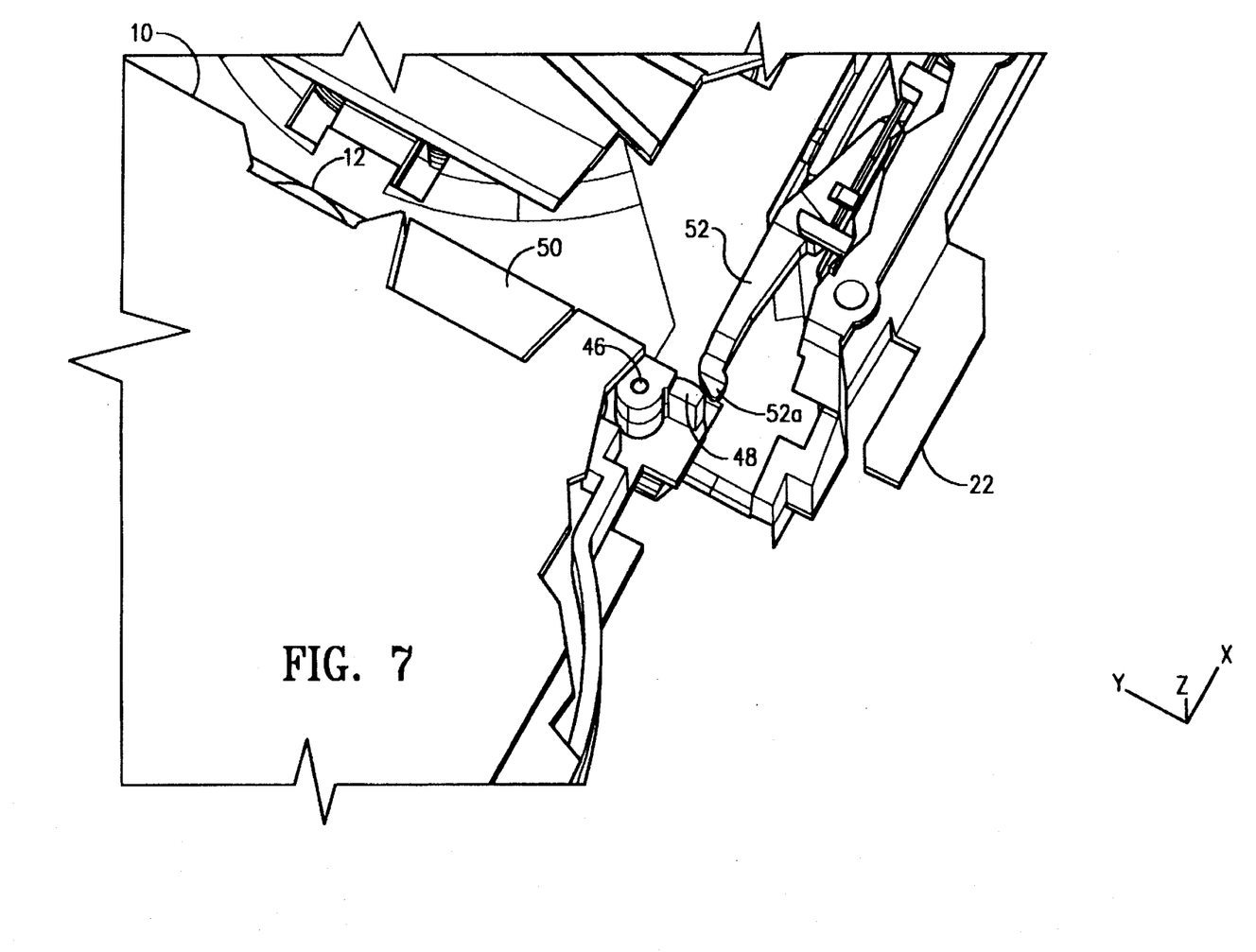
FIGS. 7–10 are a series of perspective views showing the action of the lever as a cartridge is inserted.
Figure 8:
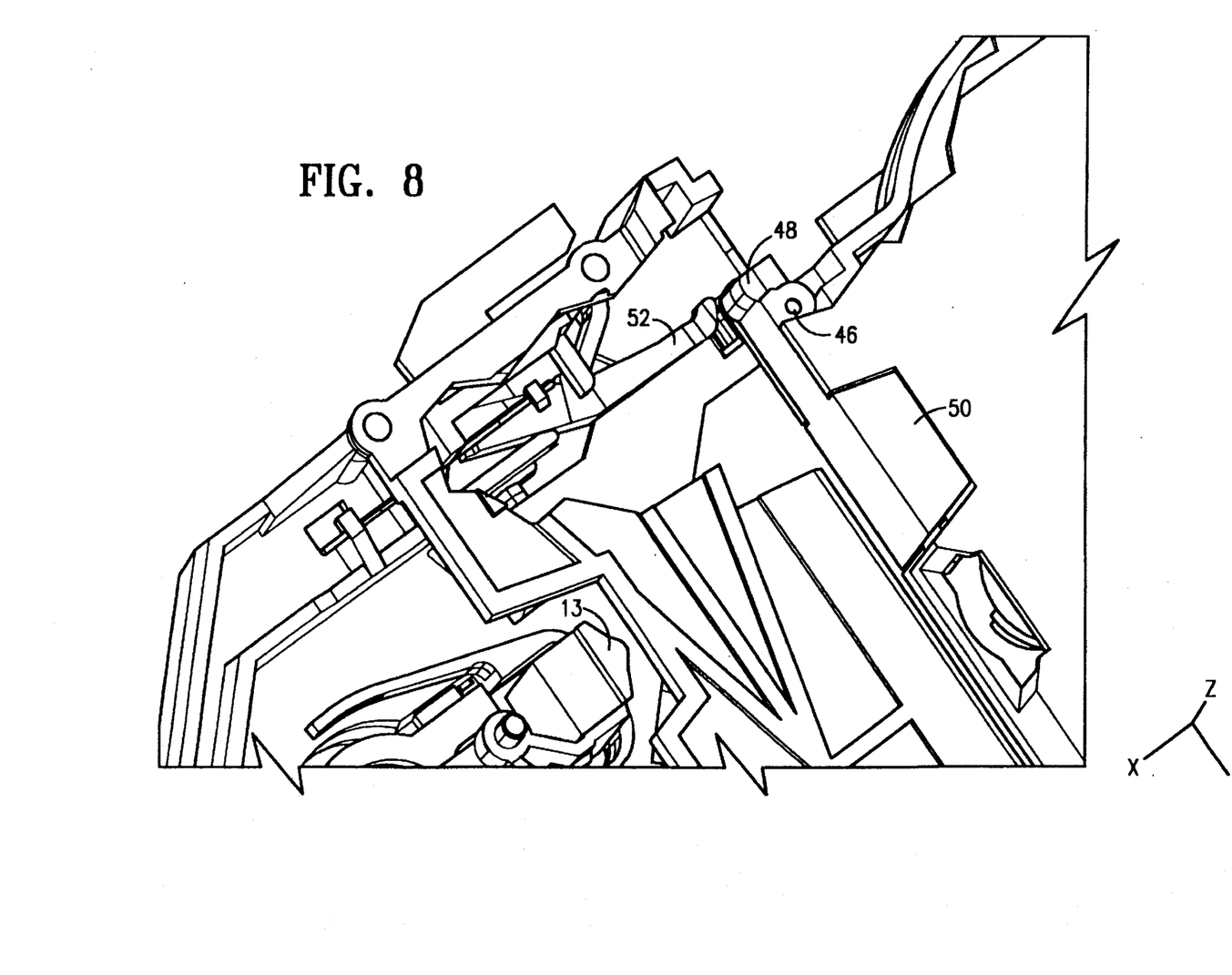

In accordance with the present invention, an opening lever 52 (FIGS. 5–10) is disposed in the drive parallel to the direction of insertion of the cartridge. The lever is mounted on a pivot 54 at the rear end thereof. The pivot 54 is on an axis perpendicular to the direction of insertion of the cartridge. When the cartridge is inserted, the front end 52a of lever 52 bears against the actuating portion 48 of the door to open the door as the cartridge enters the drive. Lever 52 moves about pivot 54 to the side of the cartridge to accommodate insertion of the cartridge into the drive. Lever 52 moves counter clockwise as shown in FIGS. 5 and 6.

Figure 9:
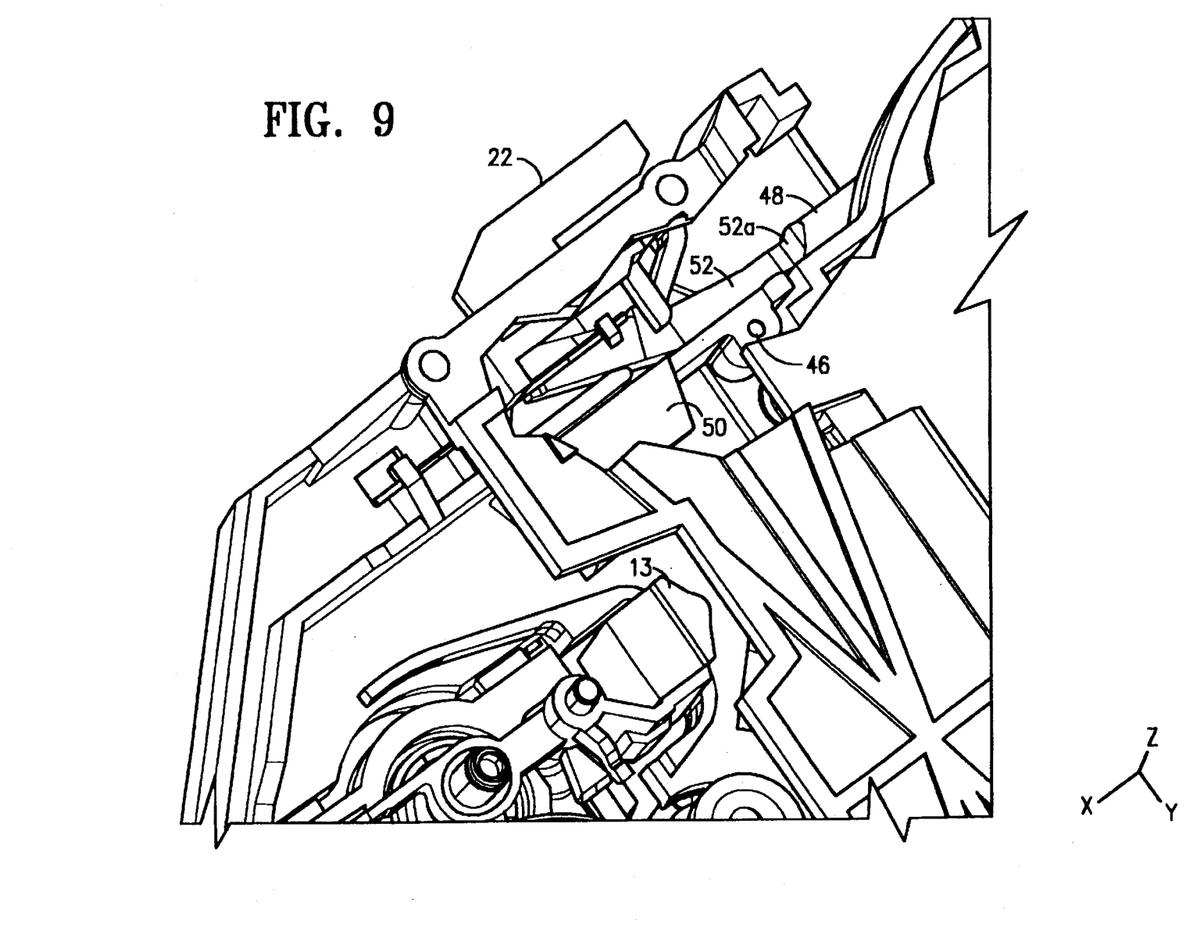
Figure 10:
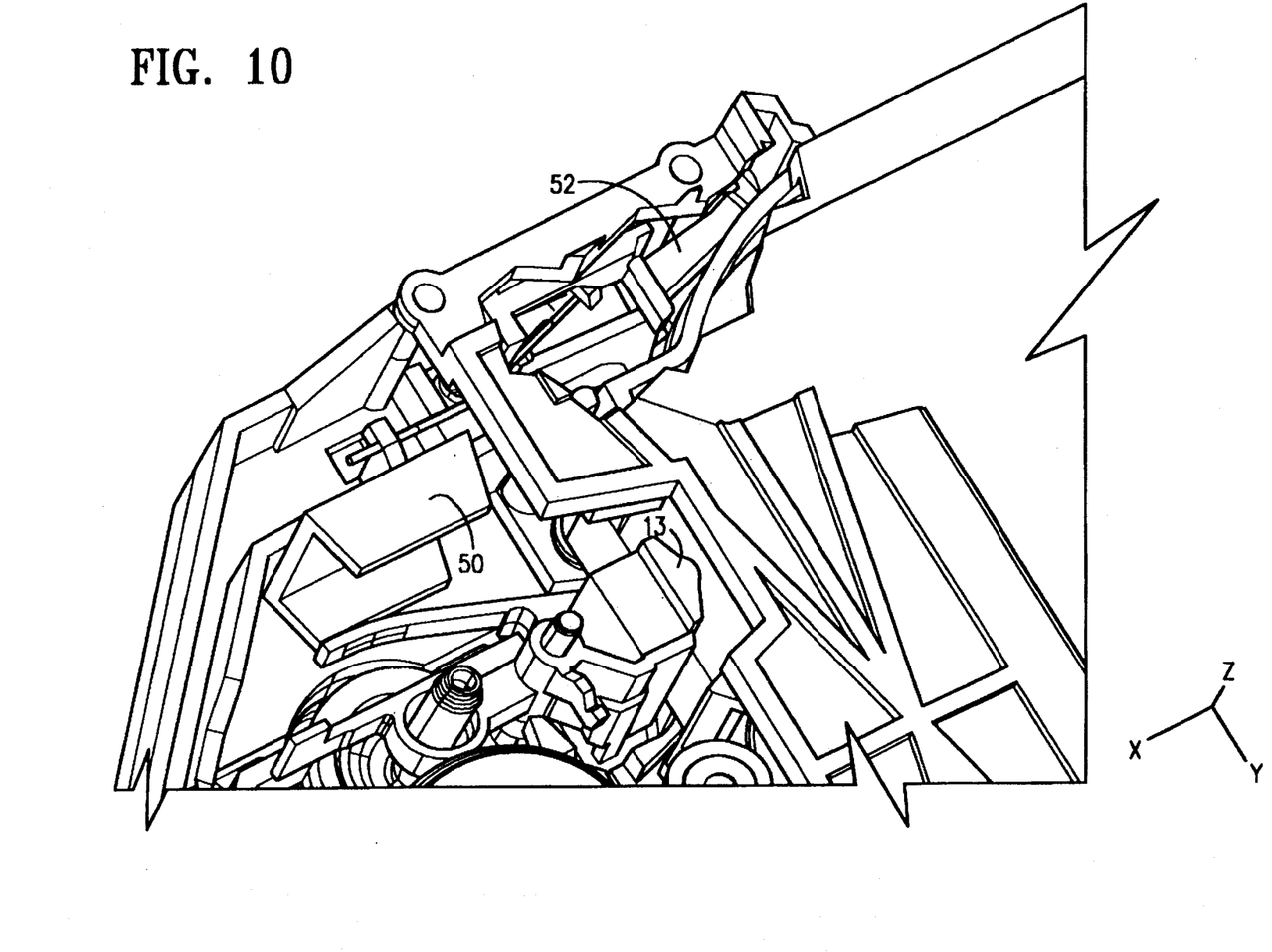

A spring 56 biases the lever to a position parallel to the direction of insertion of the cartridge, the position shown in FIGS. 5–8. The lever is movable against this bias only toward the side of the cartridge. As shown in FIGS. 9 and 10, as the cartridge is inserted into the drive, the end 52a of lever 52 pushes the actuating portion 48 of the door into the cartridge. The door pivots about its hinge 46. The opening portion 50 moves outwardly to open the door. This allows head 13 to read the magnetic tape in the cartridge.

The lever of the present invention provides significant operating advantages. It is stiff in the direction of insertion of the cartridge so that reliable opening of the door is achieved. Also, the bias on the lever, supplied by spring 56 does not interfere with the load force on the cartridge.

When the cartridge is inserted into the drive, spring-loaded rollers 58 and 60 (FIG. 6) engage the slots 62 and 64 in the cartridge to lock it into the drive. The cartridge is locked in the drive by the bias applied to the rollers by the torsion spring 66. A tab 68 bears against the motor to provide a constant load force between the drive roller and the driven roller. The bias provided by spring 56 does not counteract, or act against, this load force.

Various modifications may be made to the preferred embodiment. The appended claims are, therefore, intended to cover all such modifications within the true spirit and scope of the invention.

What is claimed is:

1. A magnetic tape drive for reading/writing data on magnetic tape in a cartridge of the type in which a driven roller in said cartridge moves a tape past a read/write head in said drive, said cartridge having a door in the front of said cartridge at one side thereof through which said read/write head engages said tape, said door being pivoted on a hinge, said hinge having a pivot in an axis perpendicular to the direction of insertion of said cartridge, said door having an actuating portion on one side of said hinge pivot and an opening portion on the other side of said hinge pivot, said door providing access for said read/write head, said drive comprising:

a read/write head for reading said tape through the opening portion of said door; and an elongated longitudinal opening lever having only two ends and a longitudinal axis extending between said ends, said lever being disposed with the longitudinal axis parallel to the direction of insertion of said cartridge, said lever being mounted on a lever pivot at one end of said lever, said lever pivot being on an axis perpendicular to said direction of insertion;

the other end of said lever bearing against said actuating portion of said door to open said door as said cartridge enters said drive, said lever being moveable about said lever pivot wherein, said lever being is moved by contact with said actuating portion away from said one side of said cartridge to accommodate insertion of said cartridge into said drive.

2. The magnetic tape drive recited in claim 1 further comprising:

means for providing bias to said lever to a position parallel to the direction of insertion, said lever being moveable against said bias only away from the side of said cartridge.

* * * * *